Figures 1, 3, 4, 5:
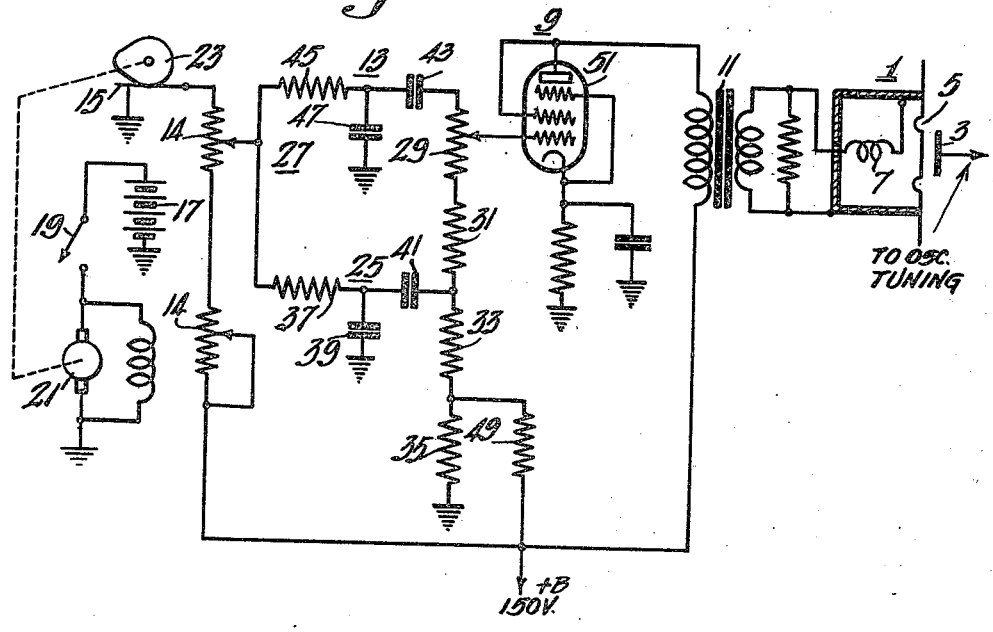

July 9, 1946.  R. C. SANDERS, JR  2,403,616
WAVE SHAPING CIRCUIT
Filed July 25, 1944

Fig.2. OPENS CLOSES

INVENTOR.
Royden C. Sanders, Jr.
BY
C D Tuska
ATTORNEY

Patented July 9, 1946

2,403,616

UNITED STATES PATENT OFFICE 2,403,616

WAVE SHAPING CIRCUIT

Royden C. Sanders, Jr., Hightstown, N. J., assignor to Radio Corporation of America, a corporation of Delaware Application July 25, 1944, Serial No. 546,537

6 Claims. (Cl. 172—239)

This invention relates to wave shaping circuits, and more particularly to improvements in the invention described and claimed broadly in U. S. application Ser. No. 512,153, filed November 29, 1943, by Irving Wolff, and entitled Vibratory mechanical systems. The present invention is disclosed but not claimed specifically in said Wolff application.

The principal object of the instant invention is to provide an improved method of and means for producing wave shapes of the type required in the practice of the invention disclosed in said Wolff application.

Another object is to provide an improved method of and means for cyclically frequency modulating a radio transmitter in such manner that the product of bandwidth swept times the modulation frequency is independent of the modulating frequency.

The invention will be described with reference to the accompanying drawing, of which Figure 1 is a schematic circuit diagram of the invention as applied to a frequency modulator system; Figure 2 is a graph of a square wave voltage employed in the operation of the system of Figure 1; Figures 3 and 4 are graphs of voltages derived from said square wave voltage in the operation of the system of Figure 1; and Figure 5 is a graph of the wave applied to the actuating coil of the vibrating capacitor unit of the system of Figure 1.

One important application of the invention is in modulation in radio distance measuring devices, such as FM altimeters and the like. FM altimeters are well known, such altimeters being described in Bentley Patent 2,011,302 and in Espenschied Patent 2,045,071. In these systems a radio wave that is radiated to a reflecting surface or object is cyclically frequency modulated. In a receiver which is located close to the point of radiation, the reflected signal is picked up and mixed or heterodyned with some of the frequency modulated signal received directly from the transmitter. The resulting difference frequency is a measure of the distance from the transmitter to the reflecting surface or object, since this frequency is determined by the time required for the radiated signal to reach the reflecting object and return to the receiver.

The beat, or difference frequency, is $$f_r = \frac{Bf_m}{246}d$$

where B is the band width swept, in megacycles per second, $f_m$ is the modulating frequency, in cycles per second, and $d$ is the distance in feet.

The product $Bf_m$ is the rate of change of transmitted frequency, in megacycles per second per second. The distance sensitivity, in beat frequency cycles per foot of distance is thus directly proportional to the rate of change of transmitter frequency $Bf_m$.

Practical experience has shown it to be desirable to employ a vibrating type modulating unit, preferably a capacitor device in which the capacity could be varied cyclically to vary correspondingly the transmitter frequency. A coil driven diaphragm unit of this type is described in copending U. S. application, Ser. No. 471,003, filed January 1, 1943, by S. V. Perry, and entitled Capacity modulator unit. Generally the variation of capacity with respect to time need not be linear, or in accordance with any other particular law, as long as it is cyclical. However, certain FM distance and speed measuring systems do require accurately linear triangular wave frequency modulation in order to perform properly the functions for which they are intended. While such modulation is obtainable with reactance tube modulators and the like, it is highly desirable, particularly in aircraft and other mobile applications, to retain the advantages of light weight, compactness, and simple construction characteristic of the vibrating diaphragm type unit. This choice, however, presents the problem of driving the diaphragm, with its physical properties of mass, resilience, and friction, so as to provide truly linear variation of capacitance with time.

Refer to Figure 1. A variable capacitor unit 1 of the type described in the aforementioned Perry application is provided with a stationary plate 3 coupled to the tuned circuit of an oscillator, not shown. A diaphragm 5 constitutes the movable capacitor electrode, which may be driven by suitable means, such as an electrodynamic drive. The drive is represented as a winding 7. Energy for the driving winding 7 is provided by a modulator amplifier 9, through a coupling transformer 11 designed to match the output impedance of the amplifier to the impedance of the winding 7.

The input circuit of the amplifier 9 includes a wave shape modification network 13, described more fully hereinafter and is connected to an intermediate tap on a voltage divider 14. One end of the voltage dividers is connected to the positive terminal B+ of the anode potential supply (not shown) and the other end is connected through a switch 15 to ground. A battery 17 is connected through a switch 19 to a motor 21, preferably the motor section of a conventional dynamotor used to supply anode potential for the amplifier 9 and other equipment. The shaft of the motor 21 carries, or is mechanically coupled to a cam 23 for periodically operating the switch 15 to produce square wave impulses which are modified by the network 13, amplified by the amplifier 9, and applied to the actuating winding 7 of the variable capacitor device 1.

The network 13 includes an integrating section 25, a differentiating section 25, and a combining section comprising series connected resistors 29, 31, 33 and 35. The resistors 29, 31, 33 and 35 also function as a load or termination for the differentiating section 27. The integrating section 25 comprises a resistor 37 and a capacitor 39 connected in series between the switch 15 and ground. The values of the resistor 37 and the capacitor 39 are selected so that their RC product, or time constant, is long with respect to the period of one cycle of operation of the switch 15. A suitable modulation frequency is approximately 110 cycles per second. A coupling capacitor 41 is connected from the junction between the resistor 37 and the capacitor 39 to a point on the combining section between the resistors 31 and 33.

The differentiating network 27 includes a series capacitor 43 having a value with respect to that of the total resistance of the resistors 29, 31, 33 and 35 such that the RC product is small as compared to the period of operation of the switch 15. Also included in the network 27 is a series resistor 45 and a shunt capacitor 47, connected like the resistor 37 and the capacitor 39 of the integrating network. The function of these elements is described below.

A resistor 49 is connected between the point B+ and the junction between the resistors 33 and 35. The resistors 49 and 35 function as a voltage divider from which a positive bias voltage is applied to the control grid circuit of the electron discharge tube 51 of the amplifier 9. A self-bias resistor 53 is provided in the cathode circuit of the tube 51.

In the operation of the above-described system, the switch 15, when closed, connects the voltage divider 14 between the point B+ and ground. The voltage at the tap of the voltage divider 14 is, therefore, somewhere between zero and the B+ potential, having a value dependent upon the adjustment of the tap. When the switch 15 is open, the full B+ potential is applied to the tap through the lower portion of the voltage divider 14. Thus as the switch 15 is opened and closed, the voltage applied to the network 13 is cyclically and discontinuously alternated between two definite values, providing a square wave form as illustrated in Figure 2.

As the switch 15 opens, the capacitor 39 starts to charge through the resistor 37. The increase of voltage across the capacitor 39 is substantially linear with respect to time during the period the switch 15 is open. When the switch 15 closes, the capacitor 39 starts to discharge through the resistor 37, since the voltage across it is higher than the voltage at the tap of the voltage divider 14. The decrease of voltage across the capacitor is also substantially linear with respect to time because the RC product of the resistor 37 and the capacitor 39 is large in relation to the period of operation of the switch 15. Accordingly the voltage across the capacitor 39 varies as shown by the graph of Figure 3, constituting a linear triangular wave. It should be noted that the slope of the wave of Figure 3 is determined only by the amplitude of the square wave voltage and the constants of the integrating circuit (values of capacitor 39 and resistor 37), and is substantially independent, throughout the operating range, of the square wave frequency. Thus, if the speed of the motor 21 decreases, decreasing the frequency of operation of the switch 15, the amplitude of the triangular wave output of the integrating circuit will increase correspondingly, since the capacitor 39 has correspondingly longer periods of charge and discharge. The slope, or rate of change of voltage, of the triangular wave thus remains constant.

The graph of Figure 3 is also representative of the form of the desired motion of the diaphragm 5 of the modulator unit 1 as a function of time. However, if the voltage across the capacitor 39 were applied to the actuating coil 7 without modification of wave shape, the motion of the diaphragm would not be a linear function of time, owing to inertia.

At each extreme of its excursion, the diaphragm tends to continue moving in the same direction after the driving force reverses, lagging the actuating current both during deceleration and acceleration and thereby producing a distorted wave of capacitance variation. In the practice of the instant invention, this effort is counteracted by predistorting the driving force by the addition of a sharp impulse at each reversal to overcome the momentum tending to cause continued motion in one direction and supply an opposite momentum to start motion in the reverse direction.

A preferred method of producing said impulses is by time differentiation of the square wave voltage of Figure 2, by the action of the capacitor 43 and the series resistors 29, 31, 33 and 35. Neglecting momentarily the effect of the resistor 45 and the capacitor 47, the capacitor 43, being relatively small, charges fully to the peak value of the applied square wave almost instantaneously upon opening of the switch 15. The short pulse of charging current, flowing through the resistors 29, 31, 33 and 35, causes a similar pulse of voltage at the input circuit of the amplifier 9. Upon closure of the switch 15, the capacitor 43 discharged through the same circuit, providing a voltage pulse of opposite polarity to the charging pulse. The pulse shape depends primarily upon the slopes of the leading and trailing edges of the square wave input to the capacitor 43. It is found in practice that the leading edge of the pulse may be too sharp to provide the desired operation of the system. The resistor 45 and the capacitor 47 are included to decrease the slopes of the edges of the square wave voltage before application to the capacitor 43, in order to reduce the slope of the leading edges of the derived pulses. The resistor 45 and capacitor 47 operate in the same manner as the resistor 37 and the capacitor 39 of the integrating section 25, but to a much smaller extent.

The triangular wave voltage from the integrating section is applied through the capacitor 41 to the resistors 33 and 35, and the pulse train from the differentiating section appears across the resistors 29, 31, 33 and 35 as explained above. The resultant voltage at the tap of the resistor 29 contains components comprising both the triangular wave and the pulse train. The proportions of these components to each other is determined by the position of the tap. The input to the control grid of the amplifier tube 51 is of the form illustrated by the graph of Figure 5.

The amplifier output wave is of the same shape but greater amplitude.

The relative amplitudes of the triangular wave and pulse components are adjusted by means of the voltage divider 29 so that the pulses just reverse the momentum of the diaphragm 5 at each end of its excursion, as described above. The amplitude of vibration of the diaphragm 5 may be adjusted by means of the voltage divider 14, which controls simultaneously the amplitudes of both components of the wave of Figure 5. As pointed out above, the amplitude of the triangular wave voltage varies inversely with variation in the modulating frequency. The amplitude of vibration of the diaphragm 5 varies likewise, so that the range of variation in oscillator tuning, B, is inversely proportional to the modulating frequency $f_m$. Thus the product $Bf_m$ remains constant, and the distance sensitivity is independent of the modulating frequency $f_m$.

The invention is described as an improved method of and means for providing linear triangular wave capacity variation for FM radio distance measuring systems with a diaphragm type vibrating capacitor modulator. A square wave voltage is produced by means of a periodic switch and a source of D.-C., modified by an integrating network to triangular form, and applied to the actuating magnet of the capacitor unit. To overcome the effect of the inertia of the diaphragm upon linearity of operation of the modulator, a pulse train is derived from the square wave and added algebraically to the triangular wave, to offset the momentum at the end of each vibration of the diaphragm and supply opposite momentum at the beginning of each vibration.

I claim as my invention:

1. In a modulator system including a vibratory variable capacitor with an electrical actuator, a system for energizing said actuator, including a source of square wave voltage, means for integrating said voltage to provide a voltage of triangular wave form, means for differentiating said voltage to provide a voltage pulse train of alternating polarities, a network for combining said triangular wave voltage and said pulse voltage, said network including common means for differentially adjusting the magnitudes of said combined voltages, and means for energizing said actuator in accordance with said combined voltages.

2. In a modulator for radio reflection systems including a vibratory variable capacitor provided with an electrical actuator, a system for energizing said actuator, including a source of square wave voltage, a voltage integrating network and a voltage differentiating network, both connected to said square wave source, a voltage combining circuit including at least one resistor connected to one of said networks and at least one other resistor connected between said networks, an adjustable tap on said second resistor, and amplifier means including an input circuit connected between said tap and a point on said first mentioned resistor, and an output circuit connected to said actuator.

3. In a modulator for radio reflection system including a vibratory variable capacitor with an electrical actuator, a system for energizing said actuator, including a source of square wave voltage, a voltage integrating network comprising a resistor and a capacitor connected in low pass filter configuration and a voltage differentiating network comprising a resistor and a capacitor connected in high pass filter configuration, both of said networks being connected to said square wave source, a voltage combining circuit including at least one resistor connected across the output of one of said networks and at least one other resistor connected between one output terminal of said differentiating network and one output terminal of said integrating network, an adjustable tap on said latter resistor, and means for energizing said actuator in response to the voltage between said tap and another point in said combining circuit.

4. A wave shaping circuit for radio reflection modulator systems, comprising a pair of input terminals, a pair of output terminals, an output circuit comprising a plurality of resistors connected in series between said output terminals, a resistor and a storage capacitor connected in series between the first of said input terminals and the second of said output terminals, a coupling capacitor connected from the junction of said storage capacitor and said last mentioned resistor to an intermediate point in said output circuit, and a differentiating capacitor connected from said first input terminal to the first of said output terminals.

5. The invention as set forth in claim 4, including a further resistor in series said differentiating capacitor, and a further storage capacitor connected from the junction of said last mentioned resistor with said differentiating capacitor to said second output terminal.

6. The invention as set forth in claim 4, wherein one of said series connected resistors of said output circuit includes an adjustable tap whereby the effects of said differentiating capacitor and said storage capacitor may be regulated differentially.

ROYDEN C. SANDERS, Jr.